(12) United States Patent
McHugh

(10) Patent No.: US 11,821,579 B2
(45) Date of Patent: Nov. 21, 2023

(54) SUPPORT FOR A SNOW BUCKET ON ICE RESURFACING MACHINES

(71) Applicant: Peter McHugh, Vernon Hills, IL (US)

(72) Inventor: Peter McHugh, Vernon Hills, IL (US)

(73) Assignee: Peter McHugh, Vernon Hills, IL (US)

( * ) Notice: Subject to any disclaimer, the term of this patent is extended or adjusted under 35 U.S.C. 154(b) by 11 days.

(21) Appl. No.: 17/750,446

(22) Filed: May 23, 2022

(65) Prior Publication Data

US 2022/0397235 A1 Dec. 15, 2022

Related U.S. Application Data

(60) Provisional application No. 63/196,255, filed on Jun. 3, 2021.

(51) Int. Cl.
*F16M 13/02* (2006.01)
*E01H 4/02* (2006.01)

(52) U.S. Cl.
CPC .......... *F16M 13/022* (2013.01); *E01H 4/023* (2013.01)

(58) Field of Classification Search
CPC ....... A47G 23/02; F16M 13/022; E01H 4/023
See application file for complete search history.

(56) References Cited

U.S. PATENT DOCUMENTS

| 6,138,387 A | * | 10/2000 | Fox | A63C 19/10 |
| | | | | 37/219 |
| 7,364,240 B2 | * | 4/2008 | Seely | E01H 4/023 |
| | | | | 37/219 |
| 7,698,837 B2 | * | 4/2010 | Seely | E01H 4/023 |
| | | | | 37/219 |
| 8,745,902 B2 | * | 6/2014 | Wood | E01H 4/023 |
| | | | | 37/219 |
| 9,809,953 B2 | * | 11/2017 | Nagano | E02F 9/2004 |
| 2011/0213528 A1 | * | 9/2011 | Schlupp | E01H 4/023 |
| | | | | 37/219 |
| 2015/0204481 A1 | * | 7/2015 | Collings | E01H 5/066 |
| | | | | 37/241 |
| 2019/0110657 A1 | * | 4/2019 | Carlson | B60D 1/02 |

* cited by examiner

*Primary Examiner* — Monica E Millner
(74) *Attorney, Agent, or Firm* — Adam K. Sacharoff; Much Shelist, P.C.

(57) ABSTRACT

The present invention is defined by having a bucket support configured to support a snow bucket on an ice resurfacing machine. The support includes a plate welded to an intermediate portion of a rod. A handle formed into an upper portion of the rod. A top bracket defined to include a notch sized to receive, for rotation therein, the intermediate portion of the rod. The top bracket further including machine openings to secure the top bracket to a first portion of the ice resurfacing machine. A base bracket configured to secure against a base portion of the ice resurfacing machine. The base bracket including a base opening sized to receive the lower portion of the rod, permitting rotation of the rod therein.

16 Claims, 20 Drawing Sheets

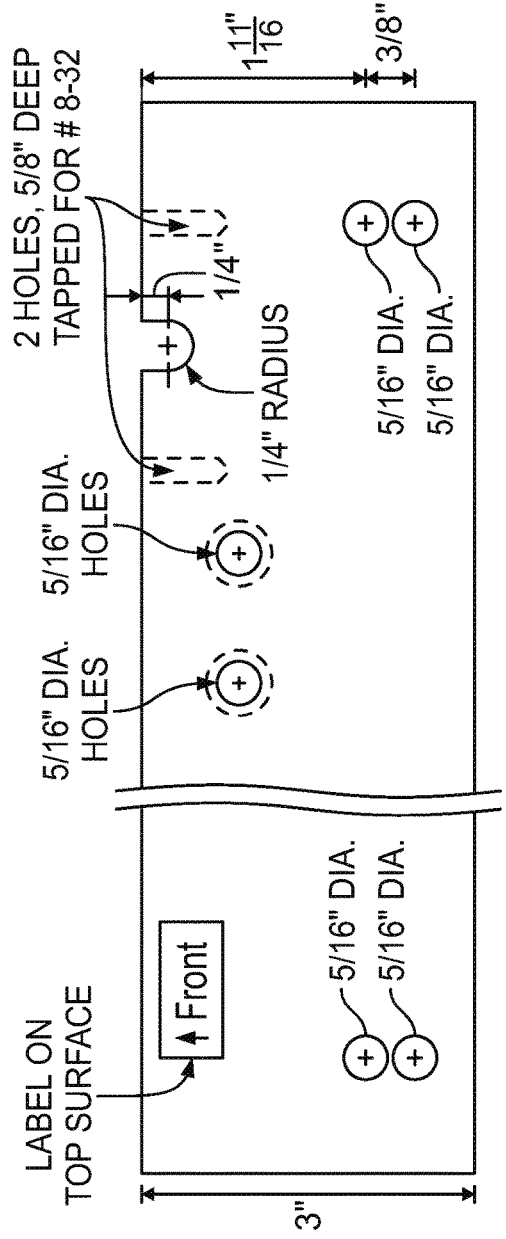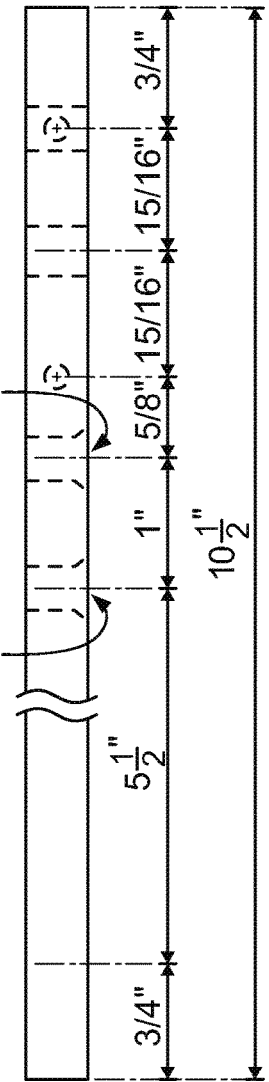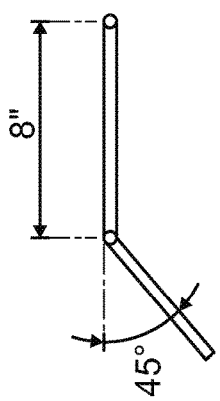

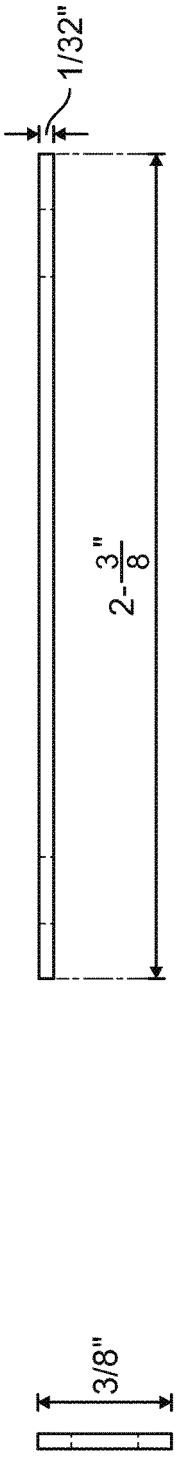
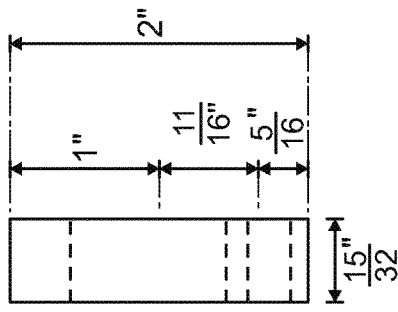
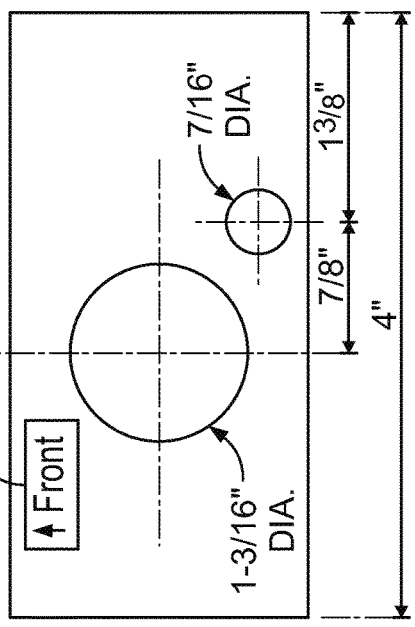
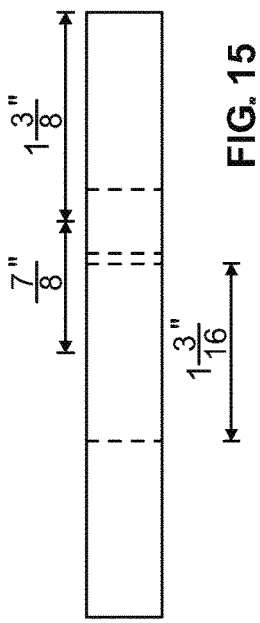

SUPPORT FOR A SNOW BUCKET ON ICE RESURFACING MACHINES

CROSS REFERENCE TO RELATED APPLICATIONS

This application claims priority to U.S. Provisional Application 63/195,255 filed on Jun. 3, 2021 and which is hereby incorporated in its entirety by reference.

FIELD OF THE INVENTION

The present invention relates to a support for a snow bucket on an ice resurfacing machine.

BACKGROUND OF THE INVENTION

Ice resurfacing machines, such as Zambonis, are provided with a metal pipe to support the snow bucket at an incline when the ice resurfacing machine is not being used. My invention replaces the pipe with an invention that provides added support to the snow bucket.

SUMMARY OF THE INVENTION

The invention is intended to reduce the risk of personal injury from manually placing the pipe under the ice resurfacing machine snow bucket. It reduces the time required to support the snow bucket. It eliminates the need to remove gloves in order to remove the support pipe from where it is stored on top of the ice resurfacing machine wall. The invention only requires one hand to operate and activate and reduces the user's interaction to support the snow bucket.

The driver only has to rotate a handle to support the snow bucket. The driver no longer has to leave the seat, pick up a pipe, lean over the wall, place the bottom of the pipe on a peg, hold the top of the pipe under the peg on the snow bucket with one hand while lowering the bucket using the downward bucket hydraulic control lever with the other hand.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3 is a top view of the bucket support in accordance with one embodiment of the invention;

FIG. 4 is a top view of the top bracket of the bucket support in accordance with one embodiment of the invention;

FIG. 5 is a side view of the top bracket of the bucket support in accordance with one embodiment of the invention;

FIG. 6 is a front view of the top bracket of the bucket support in accordance with one embodiment of the invention;

FIG. 11 is a side view of the retaining bar of the bucket support in accordance with one embodiment of the invention;

FIG. 12 is the top view of the retaining bar of the bucket support in accordance with one embodiment of the invention;

FIG. 13 is the top view of the base bucket of the bucket support in accordance with one embodiment of the invention;

FIG. 14 is the side view of the base bracket of the bucket support in accordance with one embodiment of the invention;

FIG. 15 is the front view of the base bracket of the bucket support in accordance with one embodiment of the invention;

DESCRIPTION OF INVENTION

Figure 1:
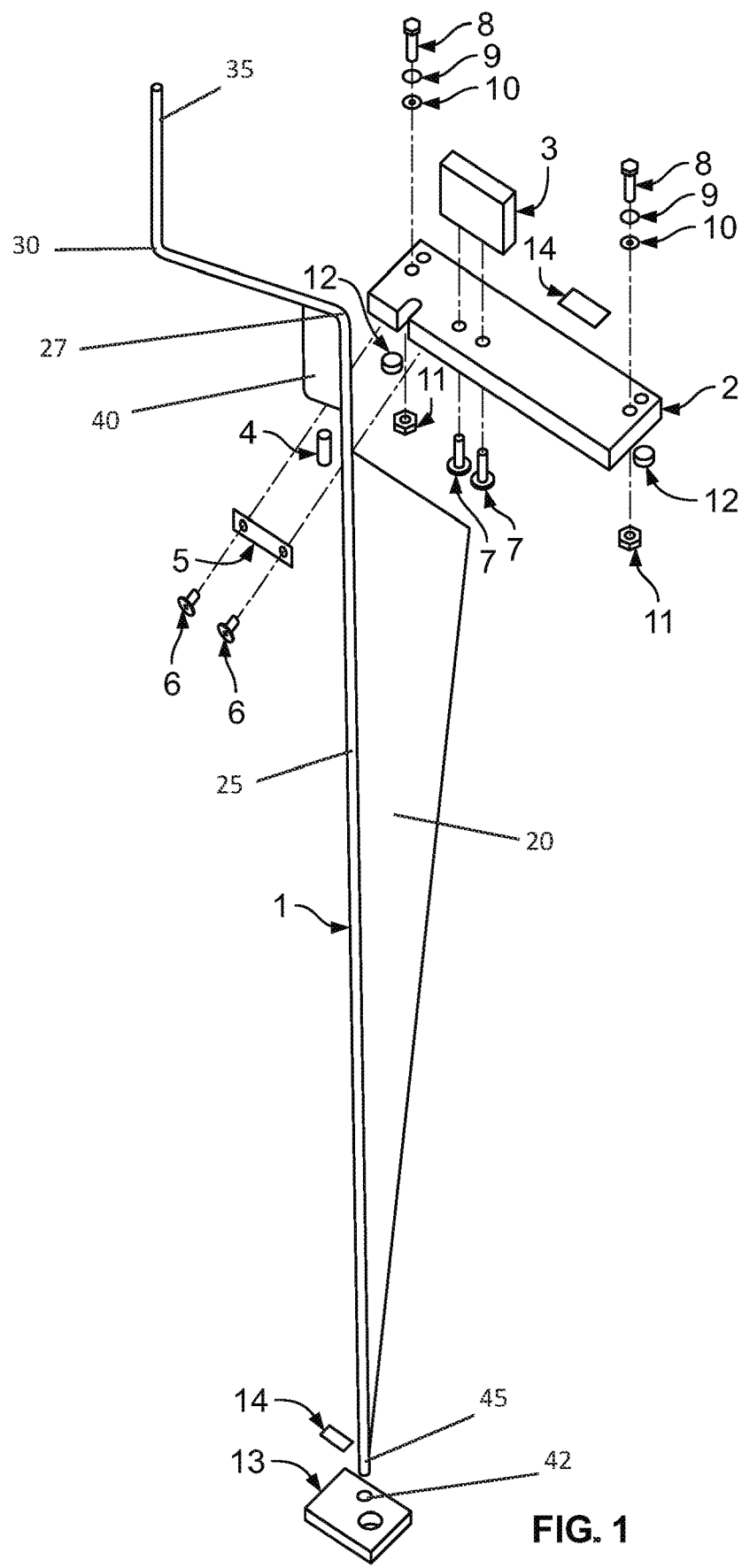
FIG. 1 is a perspective exploded view of the bucket support in accordance with one embodiment of the invention.
Figure 2:
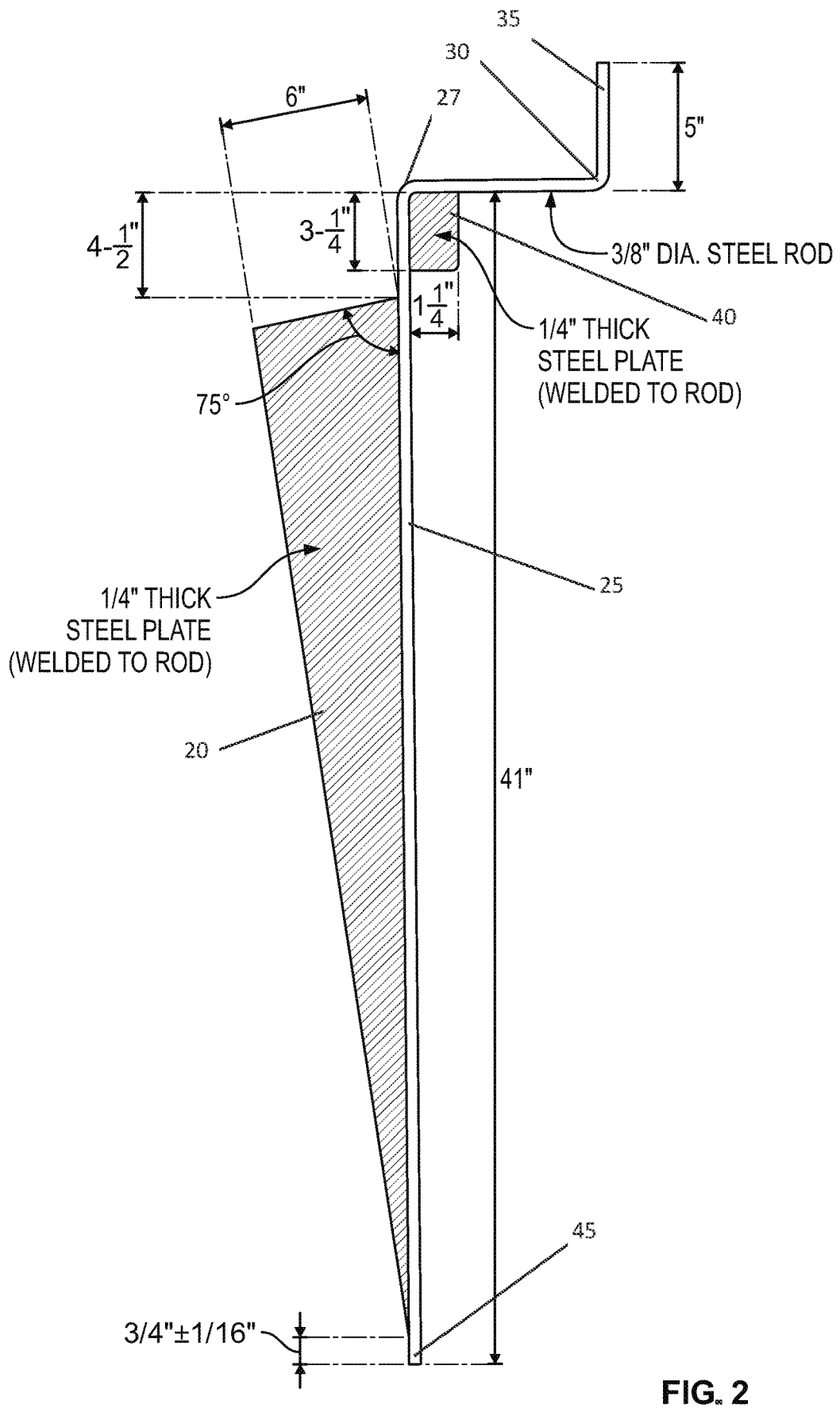
FIG. 2 is a side view of the bucket support in accordance with one embodiment of the invention.
Figure 8:
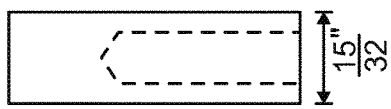
FIG. 8 is a side view of the stop block of the bucket support in accordance with one embodiment of the invention.
Figure 7:
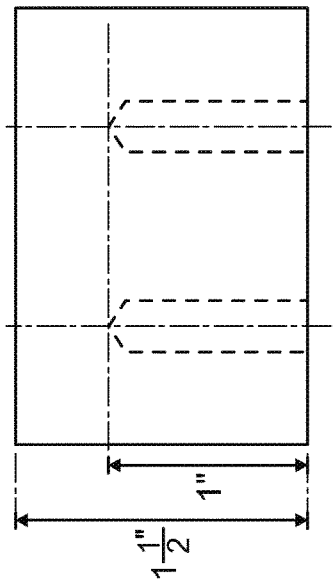
FIG. 7 is a front view of the stop block of the bucket support in accordance with one embodiment of the invention.
Figure 9:
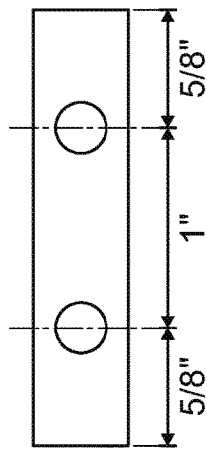
FIG. 9 is a bottom view of the stop block of the bucket support in accordance with one embodiment of the invention.
Figure 10:
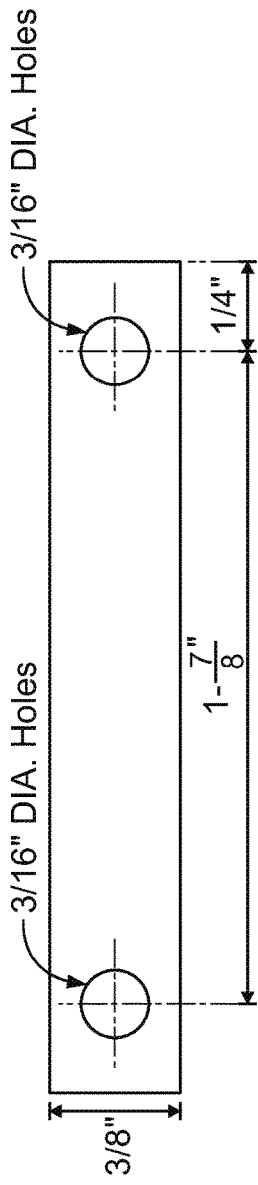
FIG. 10 is a front view of the retaining bar of the bucket support in accordance with one embodiment of the invention.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Referring now to FIGS. 1-6, a bucket support 1 is shown and illustrates as having a metal triangular plate 20 welded to a rod 25. The rod 25 is bent along a first portion 27 and then bent along a second portion 30 into a handle 35. A brace support 40 is positioned along the first portion to support the handle 35. The rod 25 includes a rubber bushing 4 wrapped around it. While the plate 20 is shown in a triangular form, it is possible and within the scope to have other shapes.

A top bracket 2, typically a plastic plate, is attached to the bucket support 1 by a retaining bar 5 with screws 6. The top bracket 2 attaches the bucket support 1 to the Ice resurfacing machine (shown and described herein below).

A stop block 3 is attached to the top bracket 2 by screws 7. When the bucket support 1 hits the stop block 3, the bucket support 1 will be perpendicular to the ice resurfacing machine wall; this is the preferred position for supporting the ice resurfacing machine snow bucket.

A label 14 indicating FRONT may be applied on top of the top bracket 2 to assist during the assembly.

An adhesive rubber pad 12 is attached under each end of the top bracket 2, in order to compensate for the difference in height of the weather strip and the top of the ice resurfacing machine wall. These pads keep the top bracket 2 parallel to the ground.

The top bracket 2 is attached to the ice resurfacing machine by existing holes in the machine that are used to attach a snow bucket weather strip. This is done by using bolts 8, stainless split ring lock washer 9, stainless flat washer 10 and, a stainless lock nut 11.

A base bracket 13 is held in place by placing it over the existing welded stud on the ice resurfacing machine frame and has an adhesive FRONT label 14 attached to its top surface. The base bracket 13 has an aperture or bore 42 sized to receive a lower portion 45 of the bucket support 1. When placed in the aperture 42 the bucket support 1 is capable of rotating or pivoting within the bore, caused by rotating the handle 35.

INSTALLATION OF THE INVENTION

Figure 16:
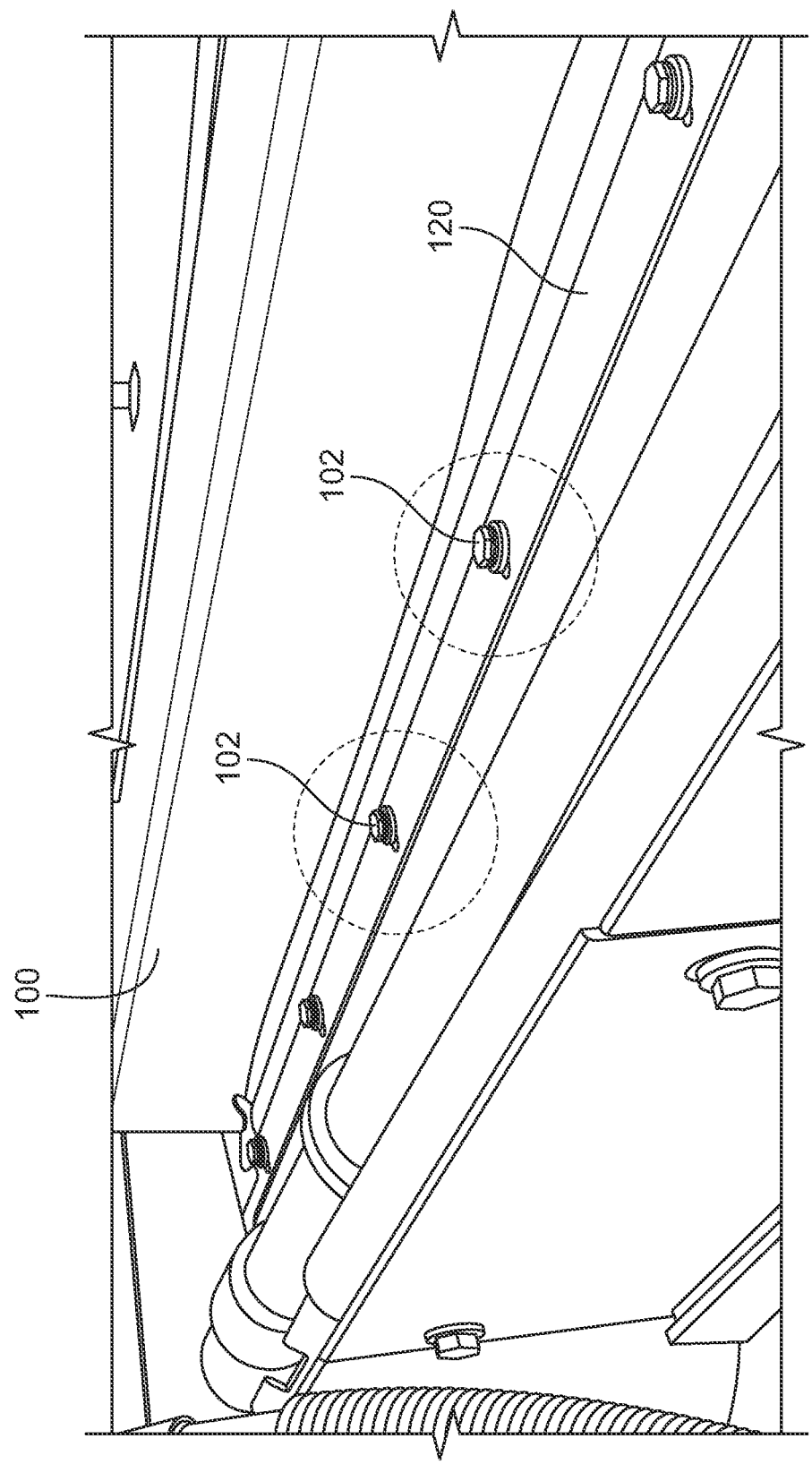
FIGS. 16-18 are photo illustrations of the ice resurfacing machine prior to the installation of the support bracket, showing the first step of the conversion in the removal of two center bolts.
Figure 17:
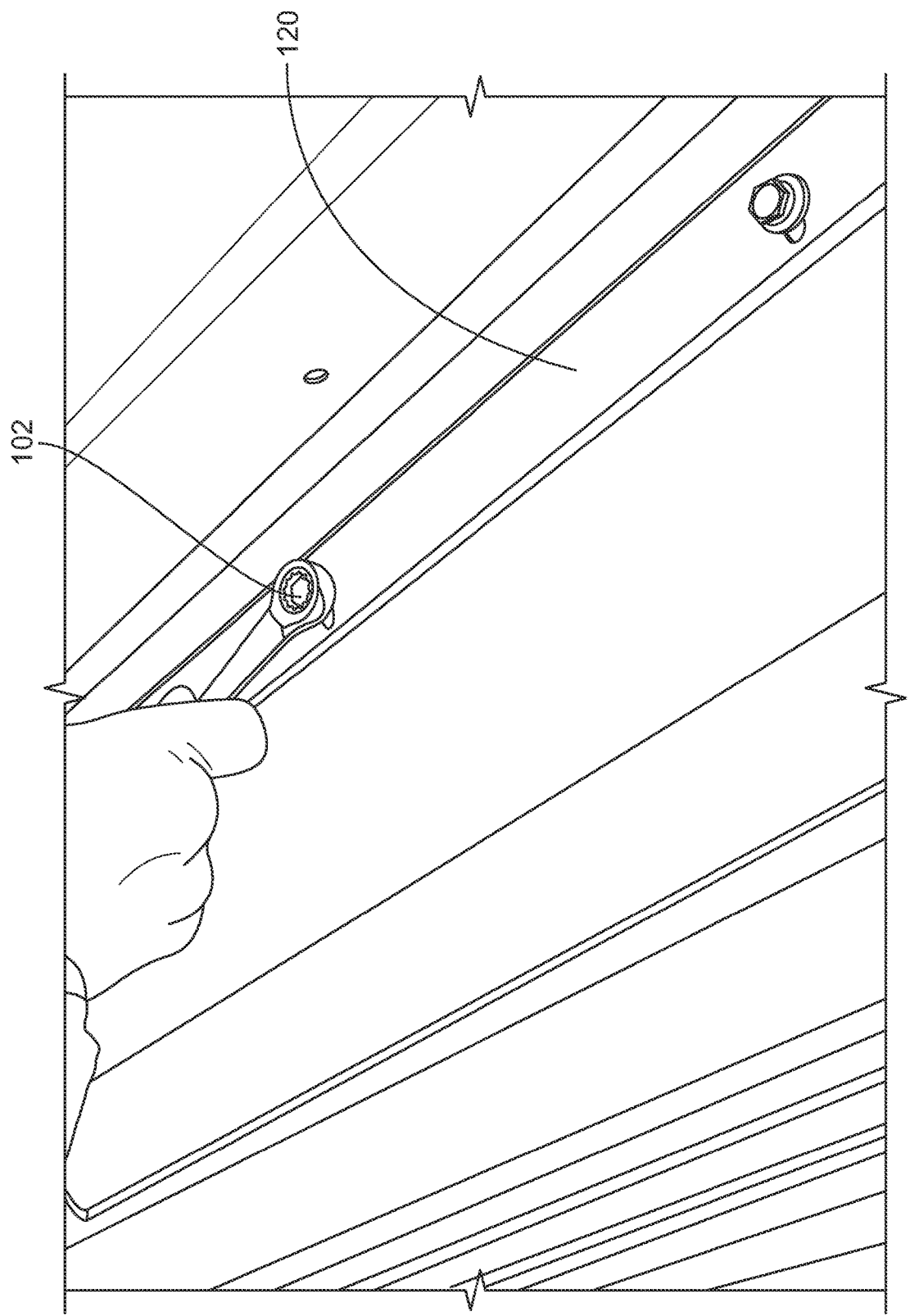

STEP 1 of the Installation of the bucket support 1 (FIGS. 16 and 18) includes: Climbing up to the driver's area of the ice resurfacing machine 100 and removing the hex head bolts 102 and washer(s) 110 in the center of the snow bucket weather strip 120, using a 7/16" wrench or socket. These are circled in FIG. 16. Depending on the model, the hole will either be tapped for 1/4"-20 threads or be a smooth through hole with a bolt, washers and hex nut to hold the weather strip to the ice resurfacing machine.

Figure 18:
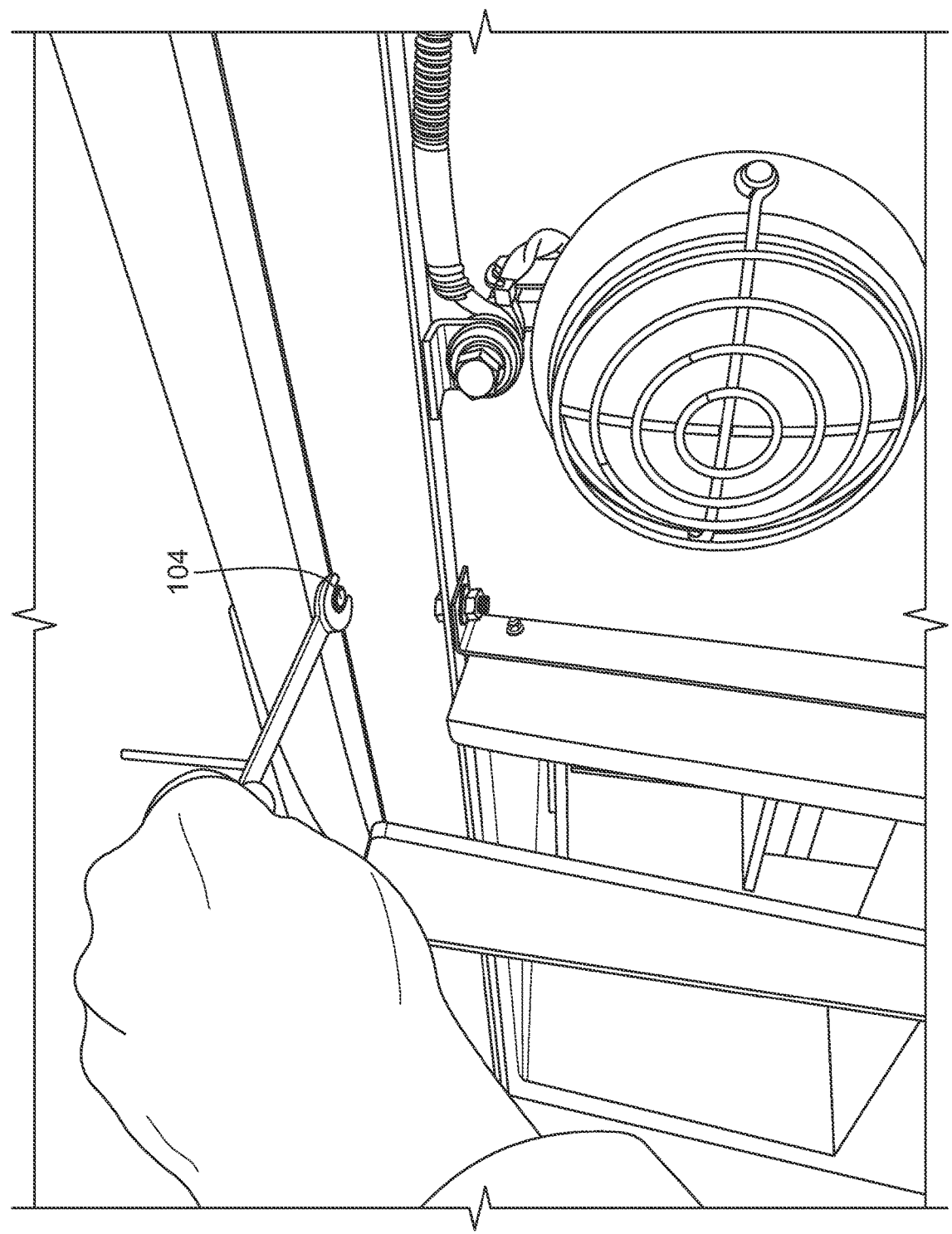

If there is a nut 104 on the bottom of the existing bolts, it is possible that the holes are not tapped for 1/4"-20 threads but are through holes. You will have to use 2 wrenches to remove the nuts—1 wrench on the hex bolt head on top of the weather strip, and 1 wrench on the bottom to remove the hex nut. FIG. 18.

STEP 2 of the Installation of the Bucket Support 1

Figure 19:
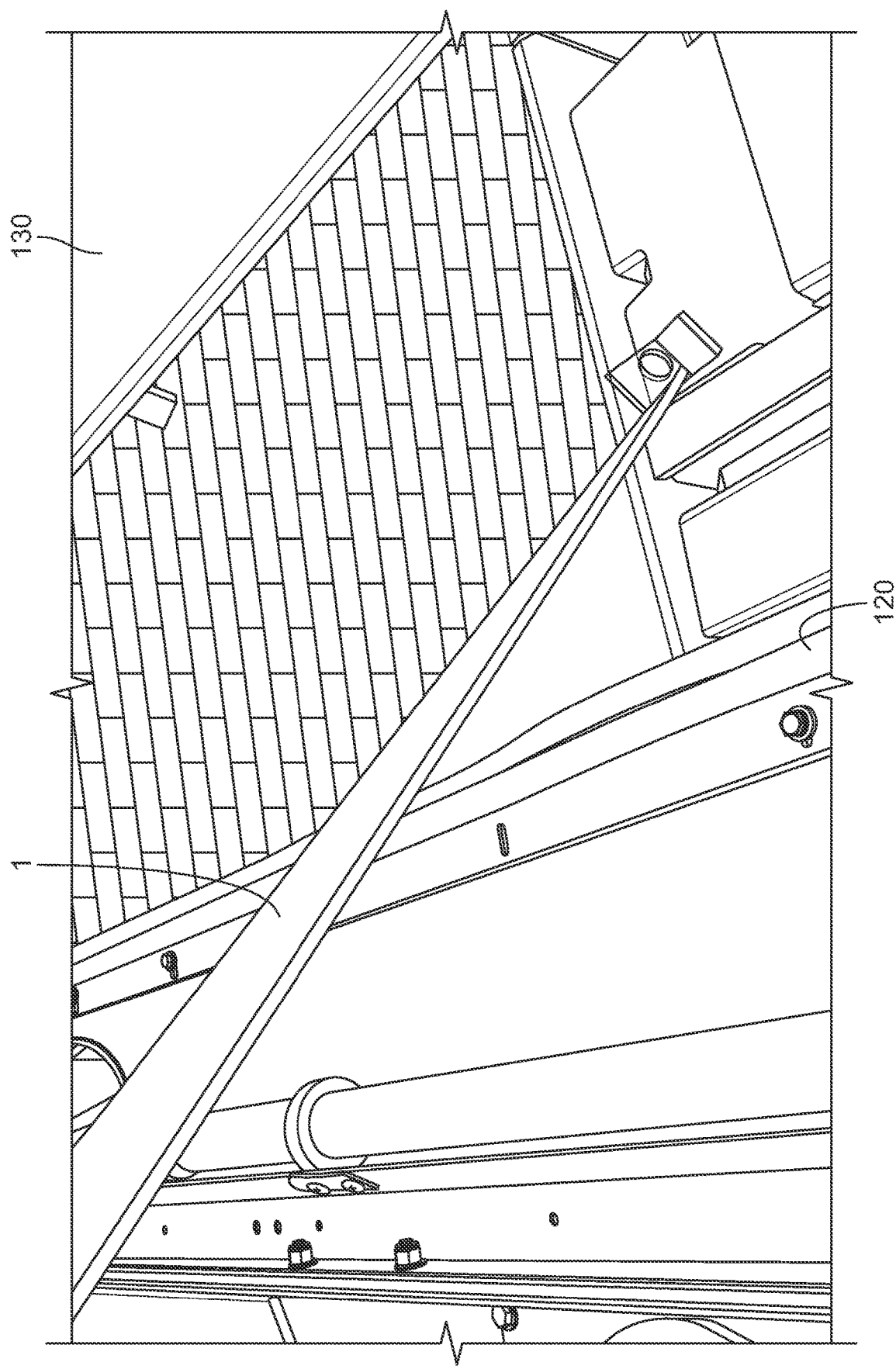
FIG. 19 is a photo illustration of the support bracket being initially placed against the ice resurfacing machine wall.

Raise the snow bucket 130 so the bottom of the snow bucket is above the top of the ice resurfacing machine wall and lift the bucket support 1 over the ice resurfacing machine wall. FIG. 19.

STEP 3 of the Installation of the Bucket Support 1

Figure 20:
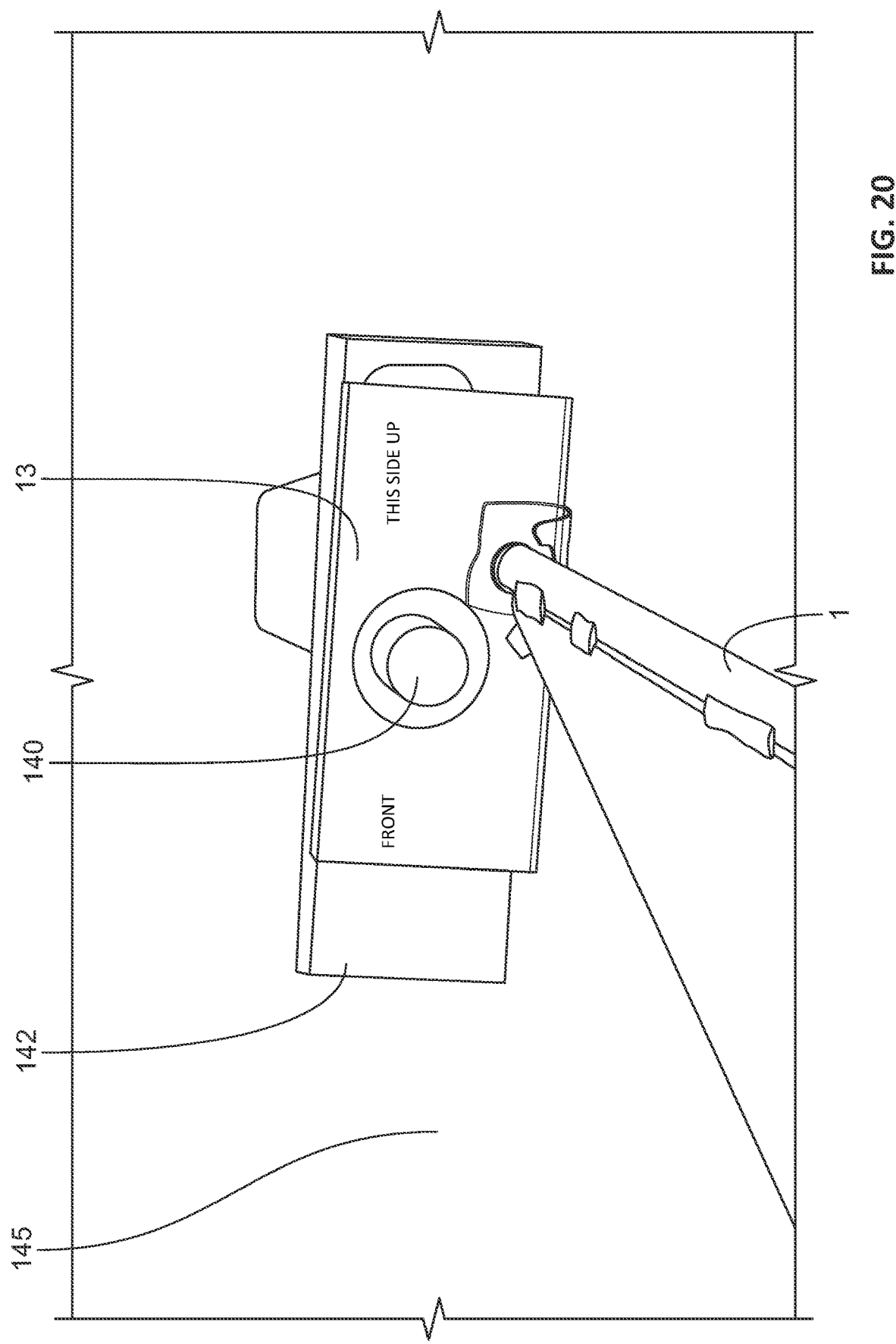
FIG. 20 is a photo illustration of the support bracket being placed against the frame of the ice resurfacing machine.

Place the base support 13 (taped to the bottom of the bucket support 1) over the metal stud 140 that is welded to the frame 142 at the base of the ice resurfacing machine wall 145 next to the water tank so the label marked "FRONT" faces towards the front of the ice resurfacing machine. FIG. 20.

STEP 4 of the Installation of the Bucket Support 1

Figure 21:
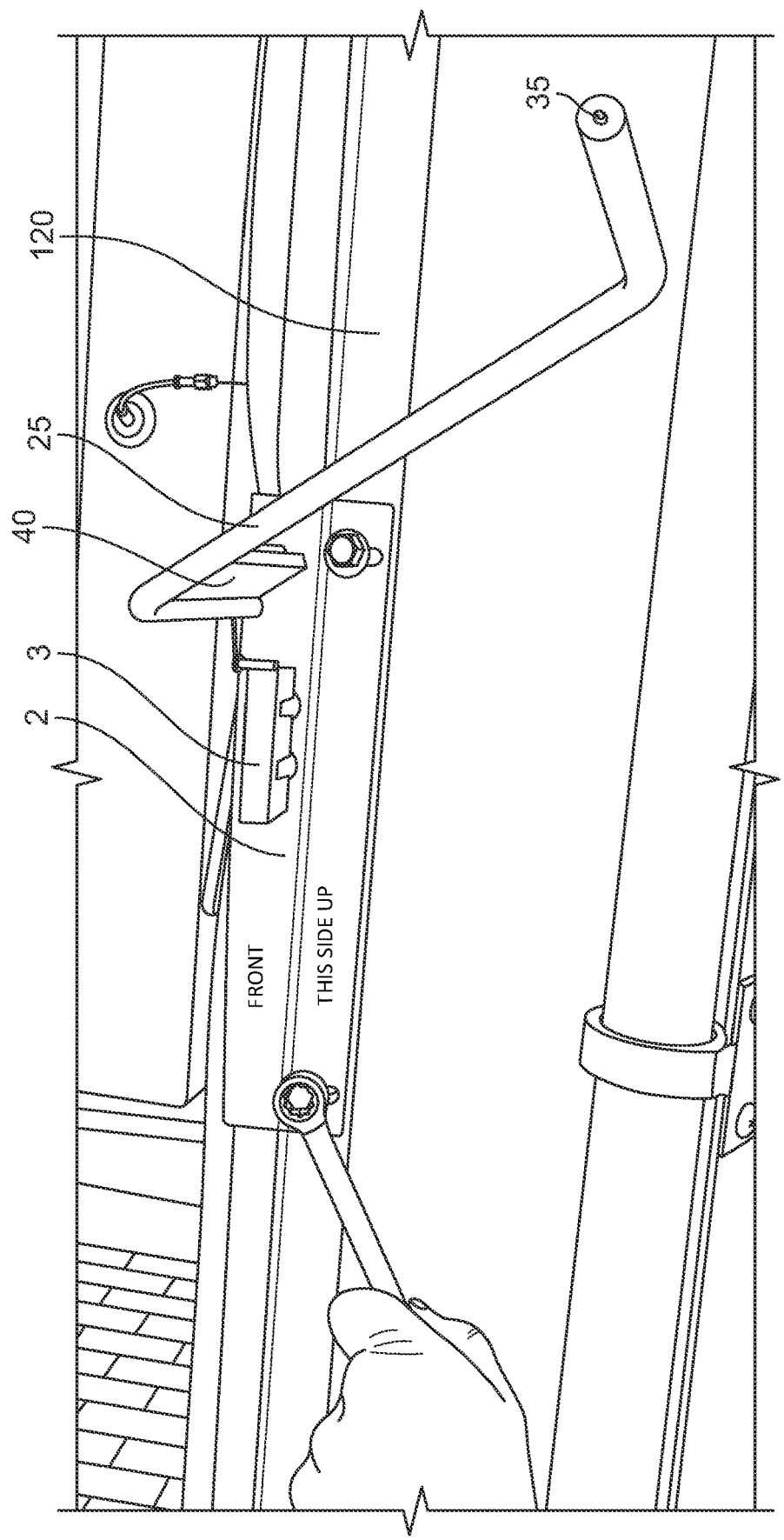
FIG. 21 is a photo illustration of the support bracket being secured to the ice resurfacing machine.

Remove the 2 hex nuts from the bolts provided in the top bracket 2. Then position the top bracket 2 over the snow bucket weather strip 120 so the rod 25 is touching the weather strip. FIG. 21. Make sure that the label "FRONT" faces toward the front of the ice resurfacing machine. Line up the top bracket 2 so that the front 2 mounting holes (shown in FIG. 21 below with bolts through them) are positioned over the holes in the weather strip where you just removed the 2 bolts (and possibly nuts). Now thread the bolts into the existing threaded holes. If the holes are threaded, tighten both bolts to 10 foot-pounds of torque.

If the holes are not threaded for 1/4"-20 threads, then they are probably through holes. In that case, you will have to use 1 wrench on the top hex head of the bolt and 1 wrench on the bottom to reattach the hex nuts to the bottom of the bolts. Tighten to 10 foot-pounds of torque.

Figure 22:
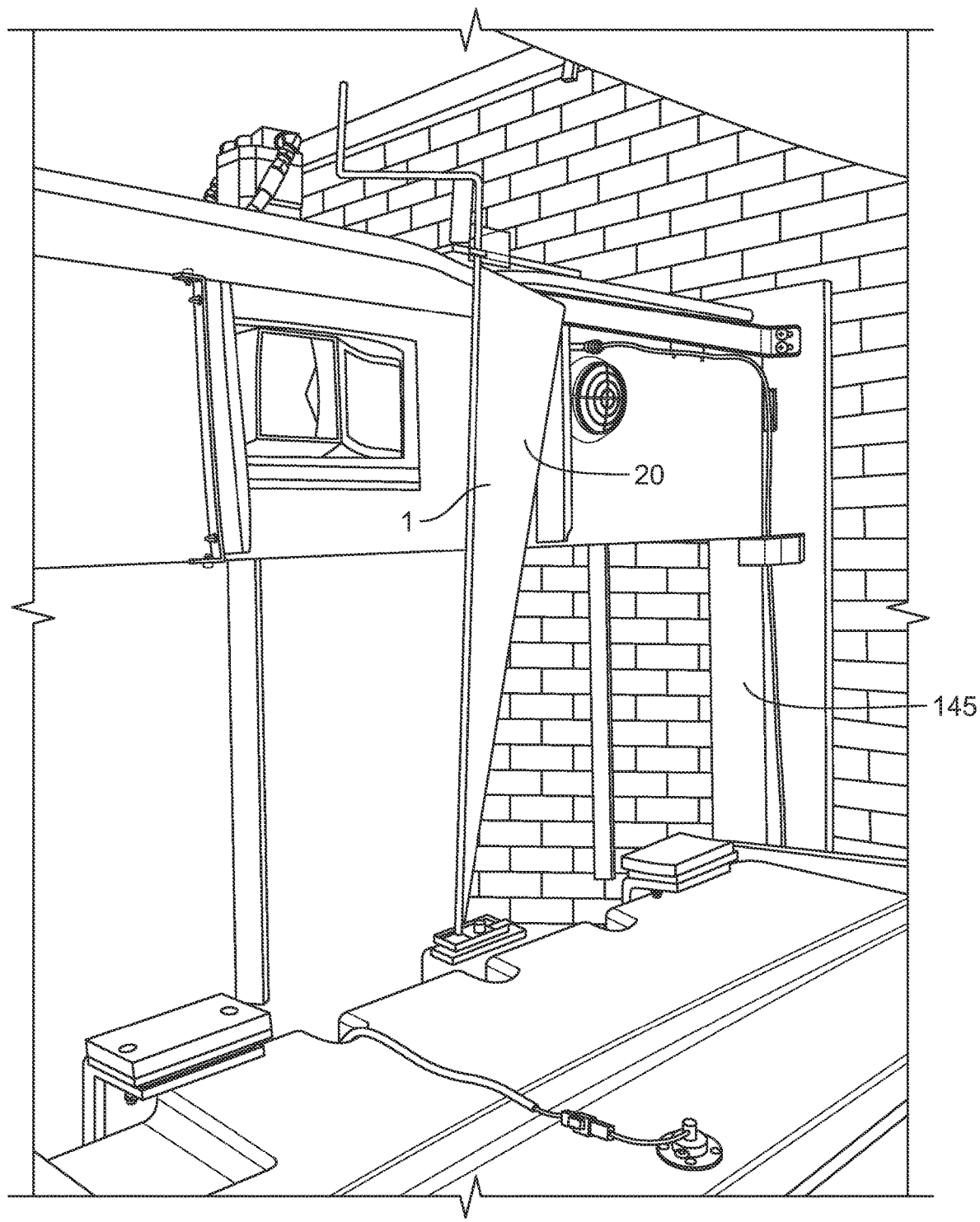
FIG. 22 is a photo illustration of the support bracket secured in place against the ice resurfacing machine wall.

Rotate the handle 35 counterclockwise so the triangular support plate 20 is parallel and/or touching the front of the ice resurfacing machine wall (FIG. 22). When it is in this position, it will be out of the way of the snow bucket when it is lowered. The bucket support 1 should look like the photo in FIG. 23 when it is ready to use.

USING THE INVENTION

TO SUPPORT THE SNOW BUCKET

Figure 23:
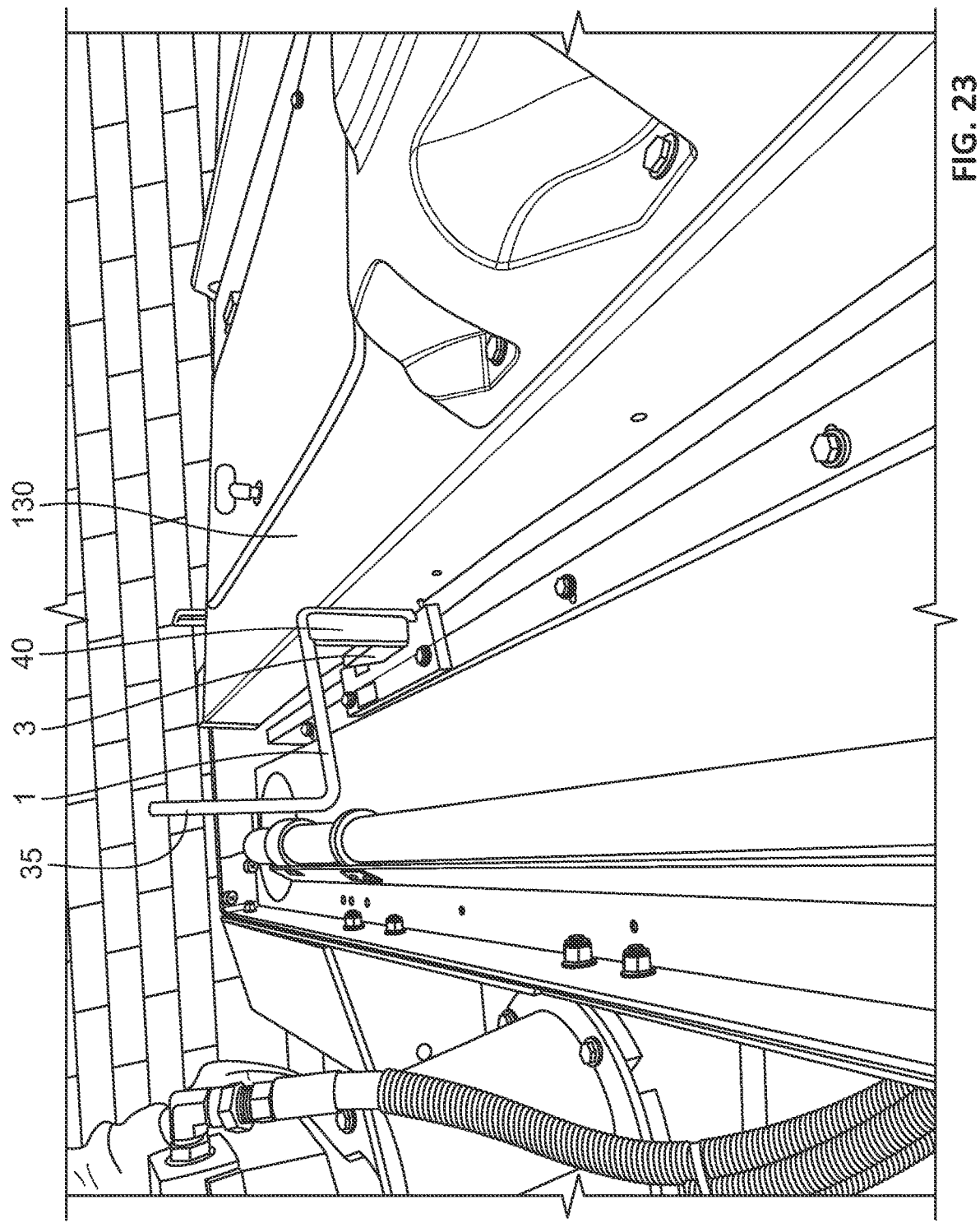
FIG. 23 is a photo illustration of the support bracket with the snow bucket in the closed position.

First, start the ice resurfacing machine, if it is not already running. You will see the handle 35 in the position as illustrated in FIG. 23.

Figure 24:
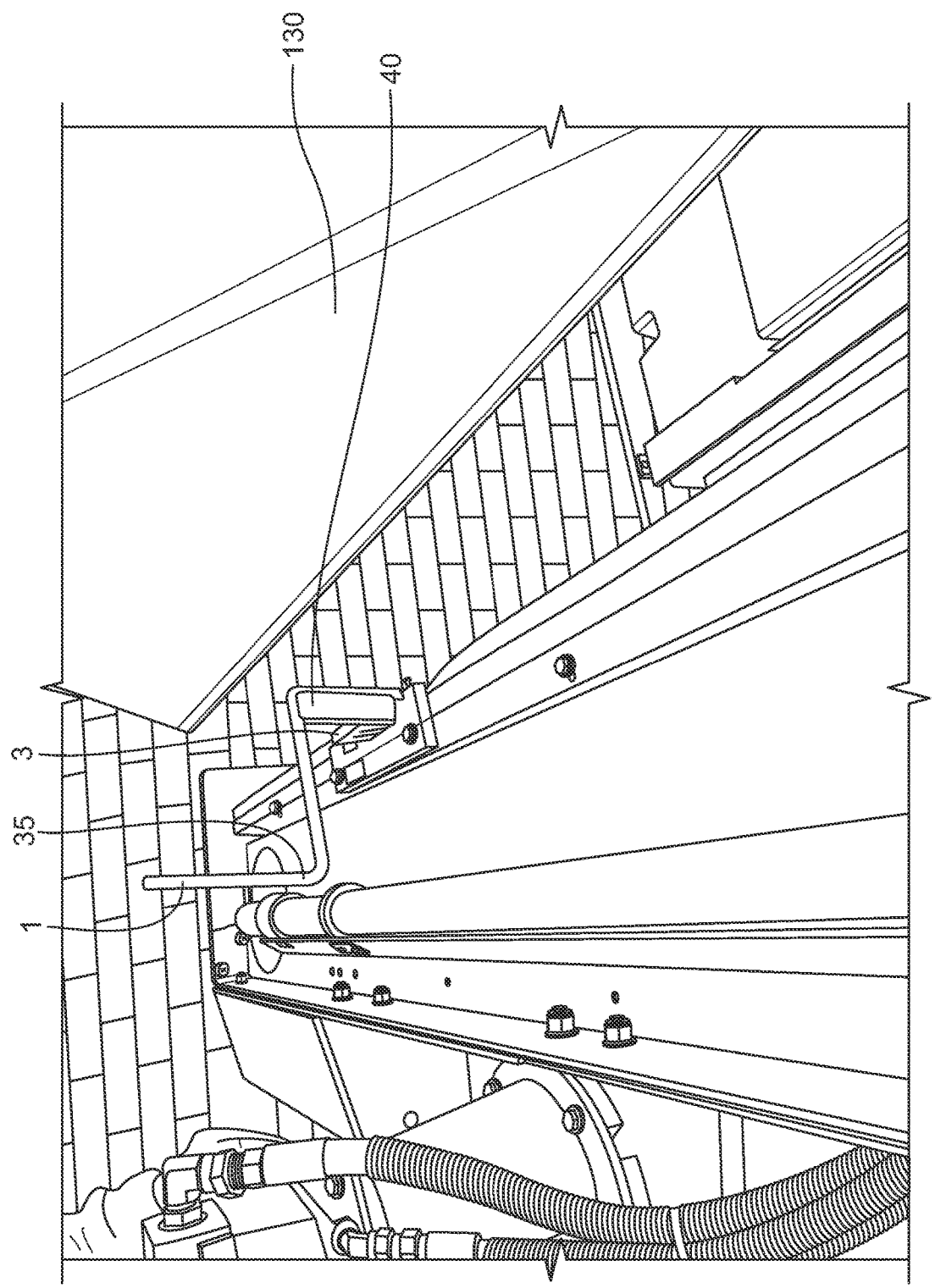
FIG. 24 is a photo illustration of the support bracket with the snow bucket in the raised position.

Next, raise the snow bucket so the bottom of the snow bucket is a few inches above the top of the ice resurfacing machine wall, FIG. 24.

Figure 25:
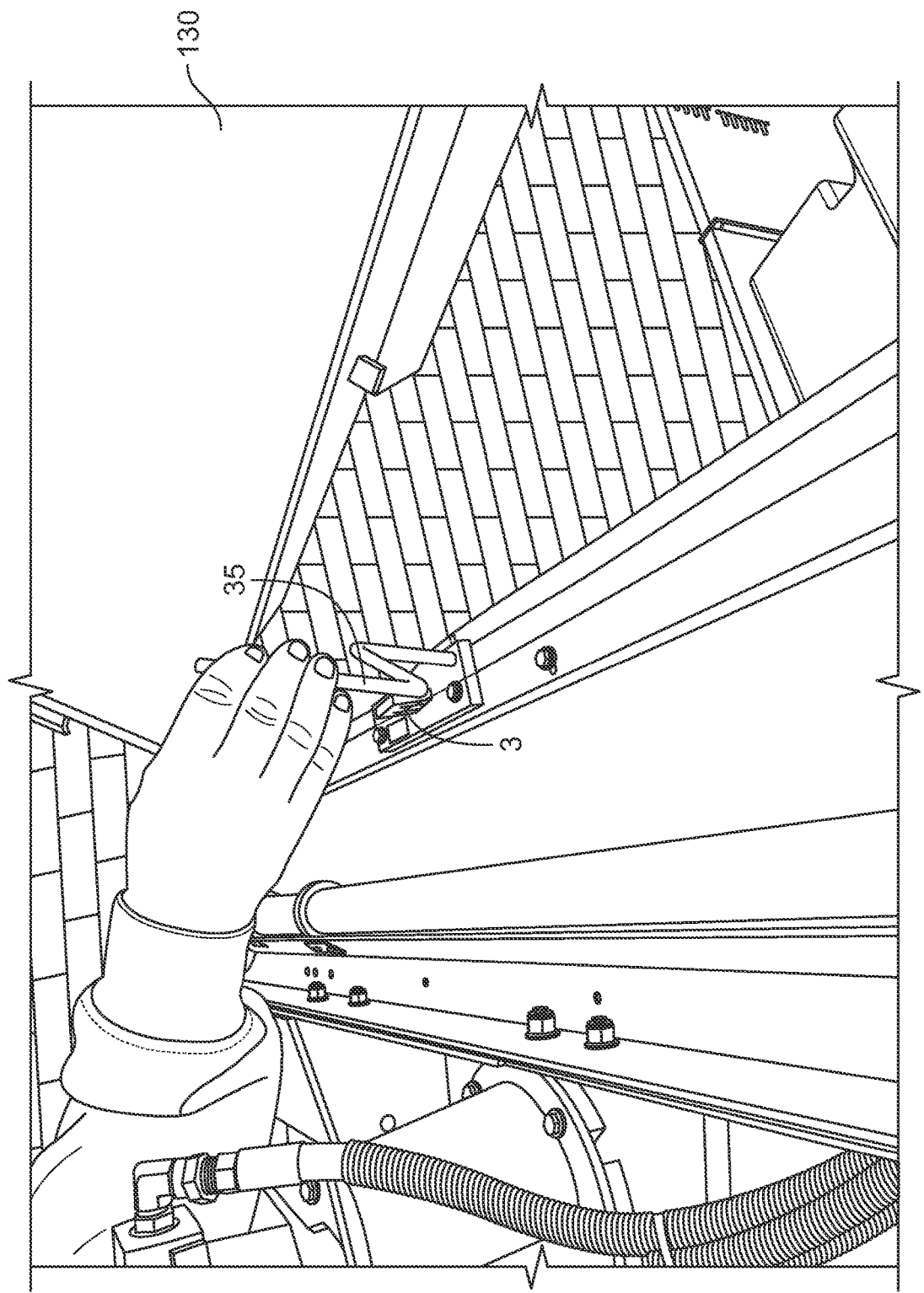
FIG. 25 is a photo illustration of the support bracket with the handle being turned.

Next, grab the handle 35 and rotate the bucket support 1 90 degrees clockwise, towards the steering wheel, FIG. 25.

Figure 26:
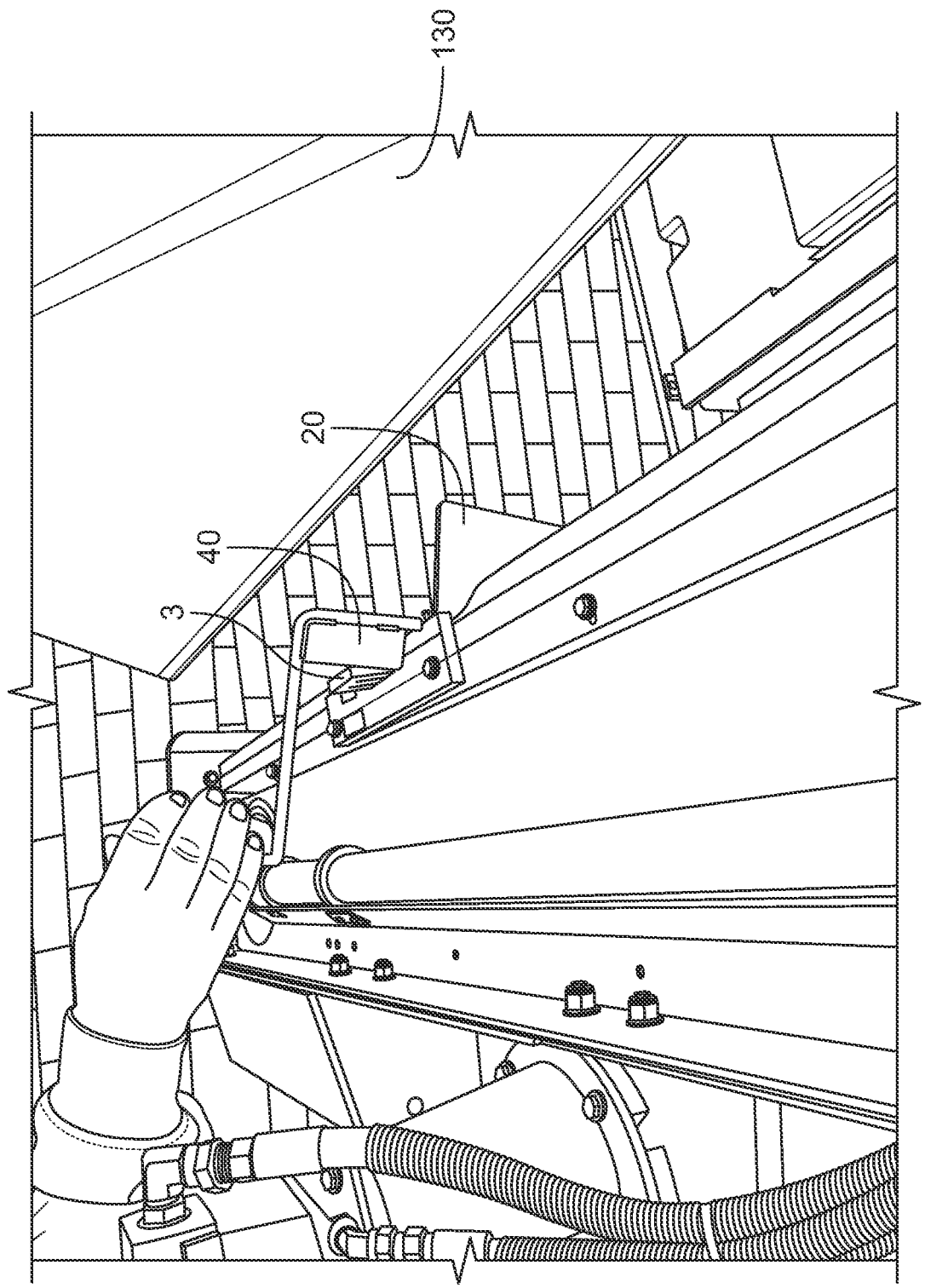
FIG. 26 is a photo illustration of the support bracket with the position of the support under the snow bucket.

The handle 35 will hit the stop block and should position the triangular plate 20 to a position such that it is pointing towards the front of the ice resurfacing machine, FIG. 26.

Figure 27:
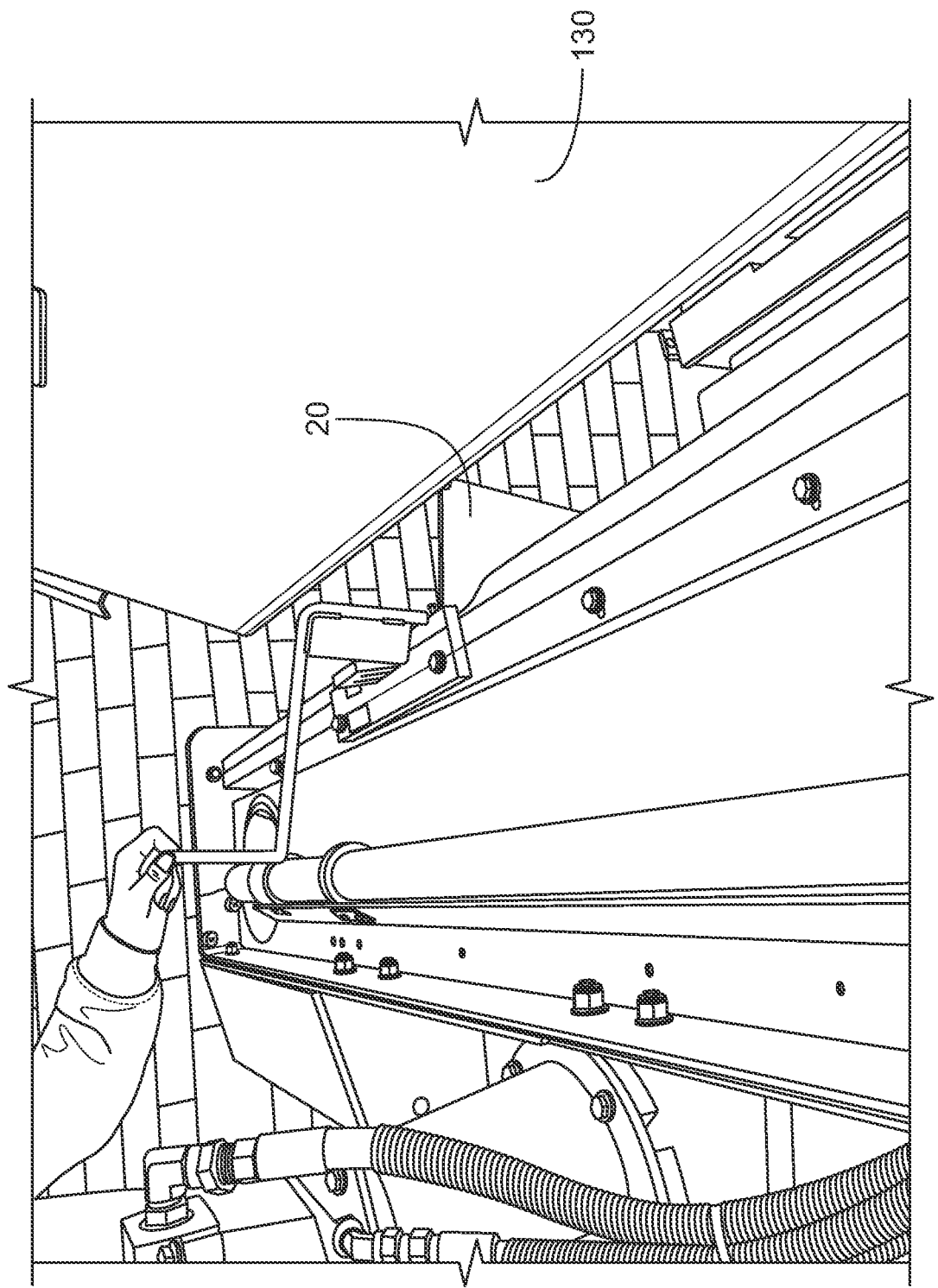
FIG. 27 is a photo illustration of the support bracket with the snow bucket being lowered onto the support bracket.

Next, you can lower the bucket, so it is resting on top of the plate 20, FIG. 27.

TO LOWER THE SNOW BUCKET

Figure 28:
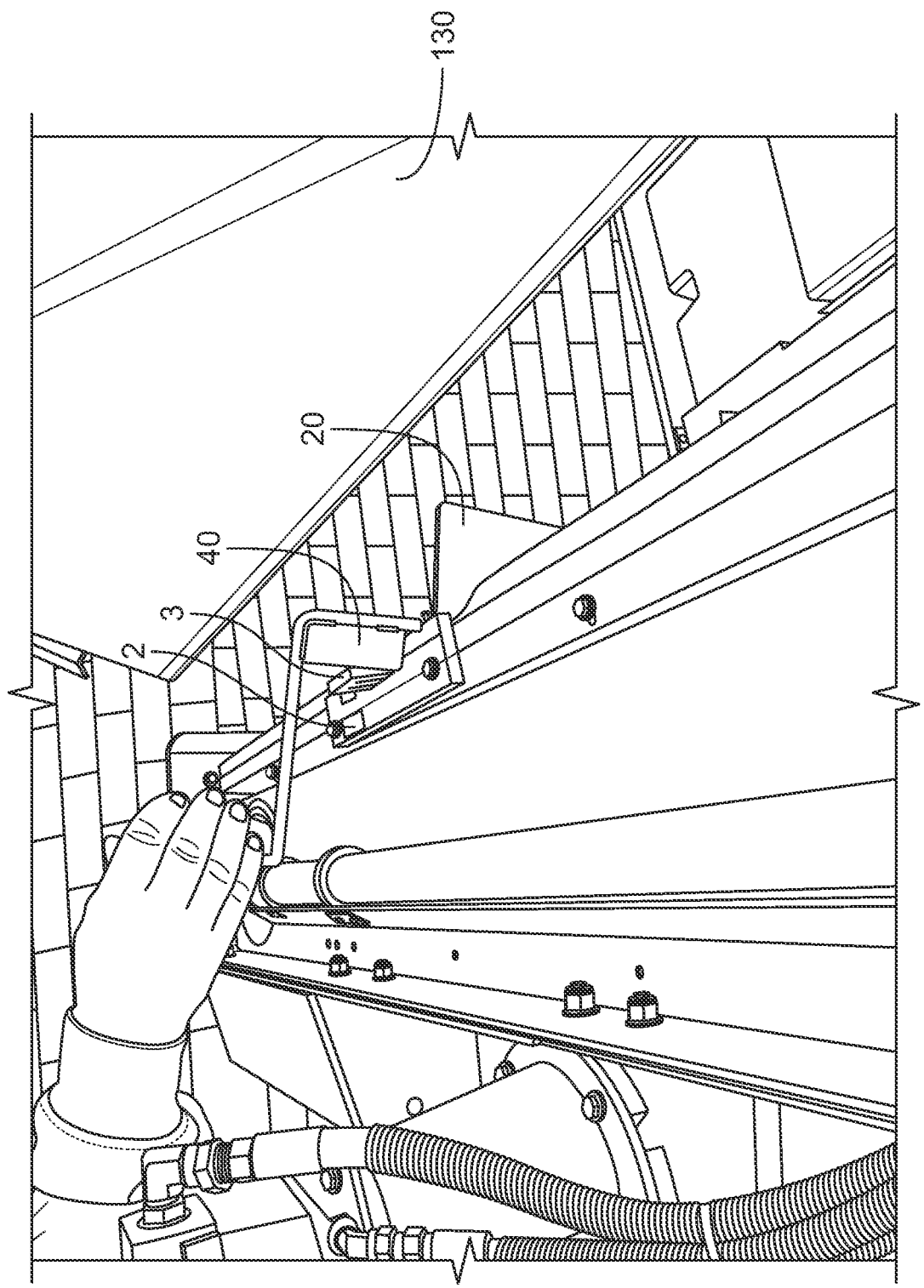
FIG. 28 is a photo illustration of the support bracket with the snow bucket being raised.

First, start the ice resurfacing machine, if it is not already running. And raise the snow bucket. Raising the snow buck about an inch or two should be enough clearance needed to rotate the bucket support, FIG. 28.

Figure 29:
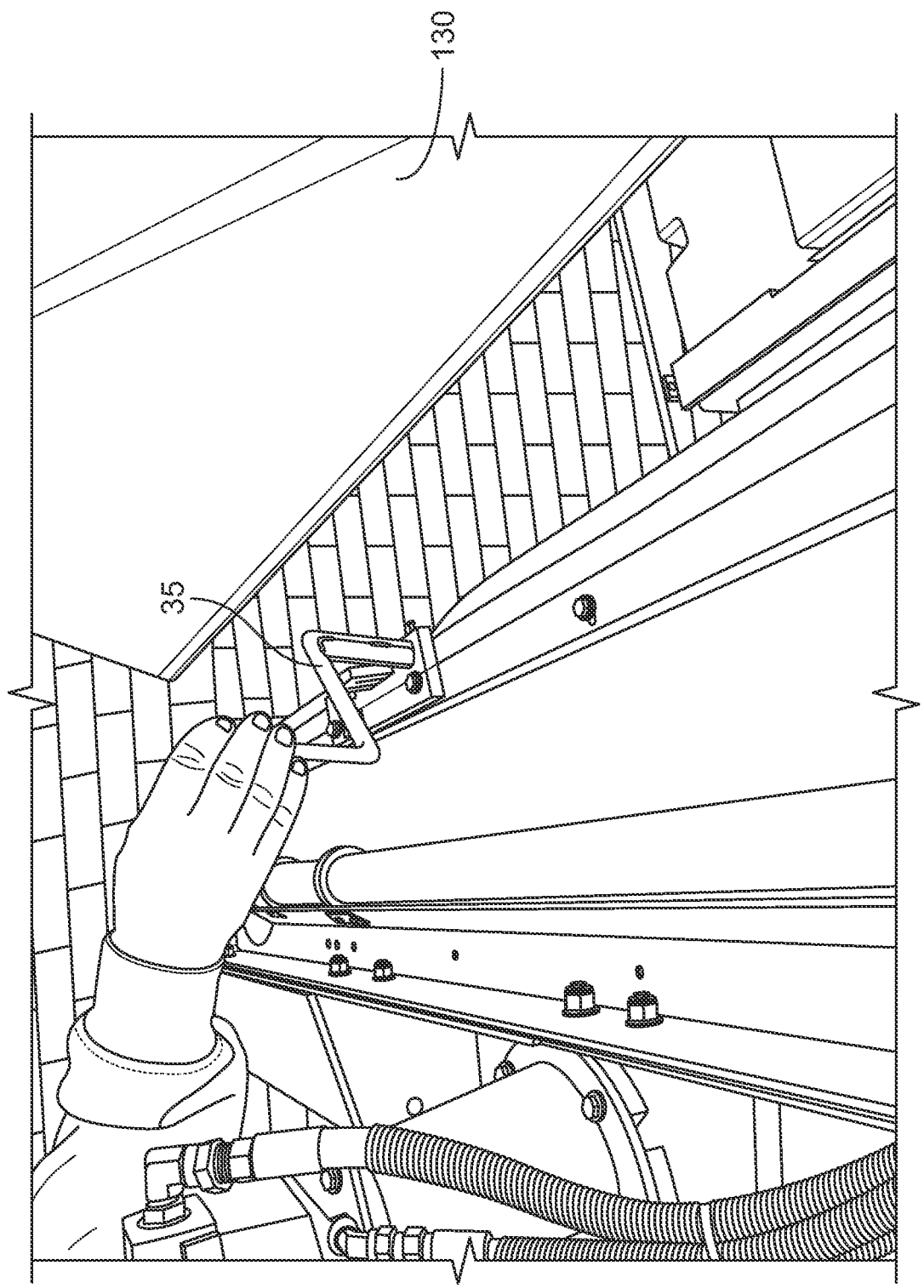
FIG. 29 is a photo illustration of the support bracket being rotated out of position from the snow bucket.

Next, rotate the handle 35 90 degrees counterclockwise (away from the steering wheel). The handle 35 will stop rotating when the triangular plate 20 touches the front of the ice resurfacing machine wall, FIG. 29.

Figure 30:
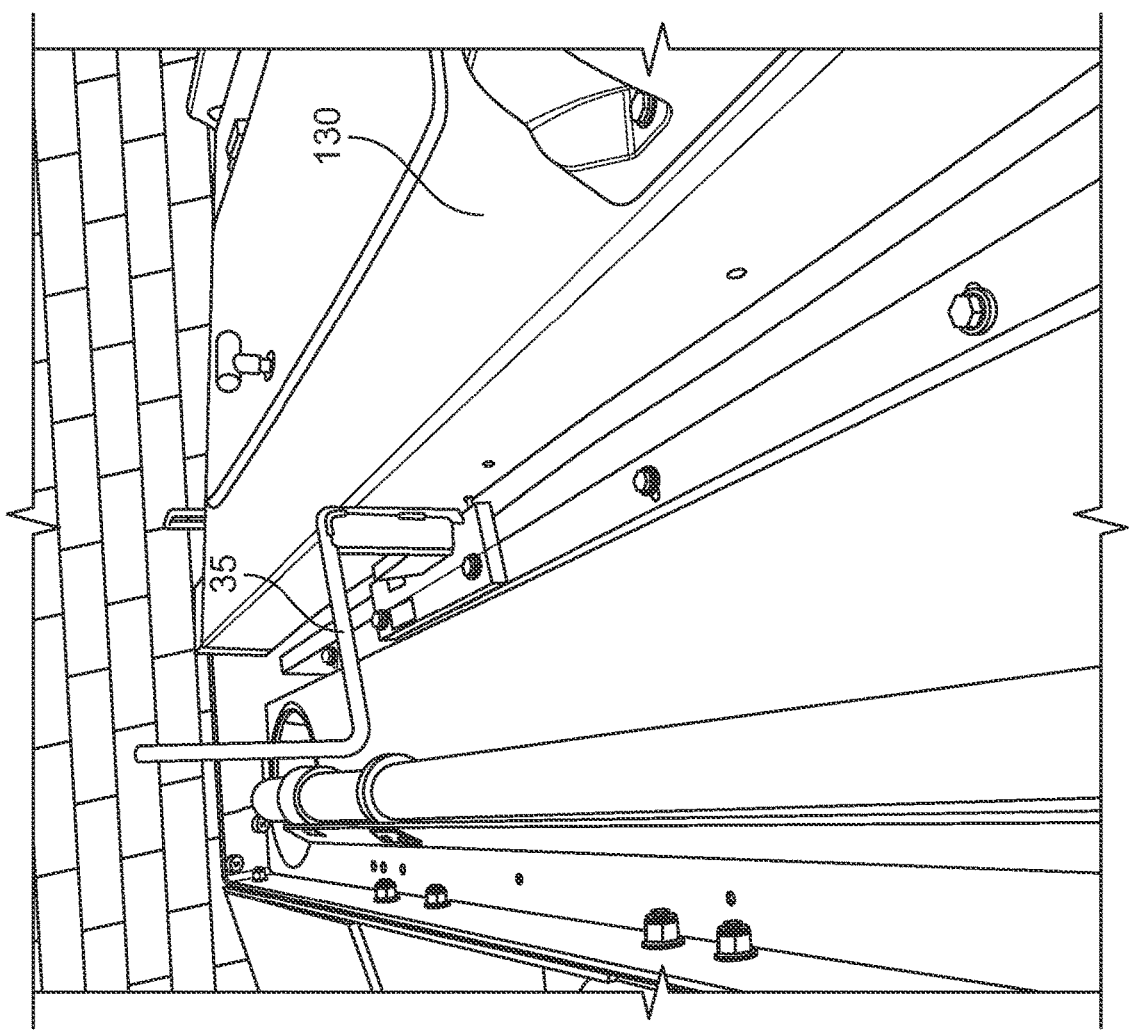
FIG. 30 is a photo illustration of the support bracket with the snow bucket in the down position.

Now the snow bucket can be lowered; it will stop on its own when it gets to the ice resurfacing machine frame, FIG. 30.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

I claim:

1. A bucket support configured to support a snow bucket on an ice resurfacing machine, the bucket support comprising:

a rod having a lower portion, an upper portion, and an intermediate portion between the lower and upper portions;

a plate welded to the intermediate portion of the rod;

a handle formed into the upper portion of the rod;

a top bracket defined to include a notch sized to receive the intermediate portion of the rod, the notch configured to permit the rotation of the rod therein, the top bracket further including machine openings configured to secure the top bracket to a first portion of the ice resurfacing machine; and a base bracket configured to secure against a base portion of the ice resurfacing machine, and the base bracket including a base opening sized to receive the lower portion of the rod, the base opening further permitting rotation of the rod therein.

2. The bucket support of claim 1, wherein the handle is configured from having the upper portion of the rod defined to include:

a first bent portion being bent away from the intermediate portion and therefore the plate;

a first member portion extending from the first bent portion;

a second bent portion being bent away from the first member portion; and a second member portion extending from the second bent portion.

3. The bucket support of claim 2 further comprising a brace support secured between the intermediate portion and the first member portion about the first bent portion of the upper portion of the rod.

4. The bucket support of claim 3 further comprising a stop block attached to a top portion of the top bracket, wherein the stop block is configured to stop the rotation of the bucket support when the rod is rotated and the brace support comes in contact with the stop block.

5. The bucket support of claim 1 further comprising an adhesive rubber pad secured under each end of the top bracket.

6. The bucket support of claim 1 further comprising a retaining bar secure to a front edge of the top bracket about the notch, such that when the rod is positioned in the notch the retaining bar is configured to secure the rod in the notch.

7. The bucket support of claim 1, wherein base bracket further configured to include a stud bore sized to fit over a stud positioned on the base portion of the ice resurfacing machine.

8. A bucket support configured to support a snow bucket on an ice resurfacing machine, the bucket support comprising:

a rod having a lower portion, an upper portion, and an intermediate portion between the lower and upper portions;

a plate welded to the intermediate portion of the rod;

a handle formed into the upper portion of the rod, the handle having a brace support secured about the handle portion adjacent the plate;

a top bracket defined to include a notch sized to receive the intermediate portion of the rod, the notch configured to permit the rotation of the rod therein, the top bracket further including machine openings configured to secure the top bracket to a first portion of the ice resurfacing machine;

a stop block attached to a top portion of the top bracket, wherein the stop block is configured to stop the rotation of the bucket support when the rod is rotated and the brace support comes in contact with the stop block; and a base bracket configured to secure against a base portion of the ice resurfacing machine, and the base bracket including a base opening sized to receive the lower portion of the rod, the base opening further permitting rotation of the rod therein.

9. The bucket support of claim 8, wherein the handle is configured from having the upper portion of the rod defined to include:

a first bent portion being bent away from the intermediate portion and therefore the plate;

a first member portion extending from the first bent portion;

a second bent portion being bent away from the first member portion; and a second member portion extending from the second bent portion.

10. The bucket support of claim 8 further comprising an adhesive rubber pad secured under each end of the top bracket.

11. The bucket support of claim 8, wherein the plate is shaped as a triangular plate.

12. The bucket support of claim 8 further comprising a retaining bar secure to a front edge of the top bracket about the notch, such that when the rod is positioned in the notch the retaining bar is configured to secure the rod in the notch.

13. The bucket support of claim 8, wherein base bracket further configured to include a stud bore sized to fit over a stud positioned on the base portion of the ice resurfacing machine.

14. A method of retrofitting an ice resurfacing machine with a bucket support, the method comprising the following steps:

providing a bucket support defined to include: a rod having a lower portion, an upper portion, and an intermediate portion between the lower and upper portions; a plate welded to the intermediate portion of the rod; a handle formed into the upper portion of the rod; a top bracket defined to include a notch sized to receive the intermediate portion of the rod, the notch configured to permit the rotation of the rod therein, the top bracket further including first machine openings; and a base bracket having a second machine opening, and the base bracket including a base opening sized to receive the lower portion of the rod, the base opening further permitting rotation of the rod therein.

removing a pair of first bolts from bolt openings positioned in an upper portion of the ice resurfacing machine;

raising the snow bucket on the ice resurfacing machine;

placing the second machine opening defined by the base bracket onto a bolt head defined on the base of the ice resurfacing machine; and positioning the notch in the top bracket about the intermediate portion of the rod and positioning the first machine openings over the bolt openings on the upper portion of the ice resurfacing machine and resecuring the pair of first bolts through the first machine openings and bolt openings.

15. The method of claim 14 further including the steps of securing a brace support about a portion of the handle adjacent the plate providing a stop block attached to a top portion of the top bracket;

rotating the handle to move the plate under the snow bucket until the brace support comes in contact with the stop block.

16. The bucket support of claim 1, wherein the plate is shaped as a triangular plate.

* * * * *